(12) United States Patent
Peyron et al.

(10) Patent No.: US 11,512,638 B2
(45) Date of Patent: Nov. 29, 2022

(54) SURFACE HEAT-EXCHANGER FOR A COOLING SYSTEM OF AN AIRCRAFT TURBOJET ENGINE

(71) Applicant: Safran Nacelles, Gonfreville l'Orcher (FR)

(72) Inventors: Vincent Peyron, Moissy Cramayel (FR); Jean-Nicolas Bouchout, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 62 days.

(21) Appl. No.: 16/839,123

(22) Filed: Apr. 3, 2020

(65) Prior Publication Data
US 2020/0318546 A1 Oct. 8, 2020

(30) Foreign Application Priority Data

Apr. 3, 2019 (FR) ...................................... 1903540

(51) Int. Cl.
*F02C 7/16* (2006.01)
*F28F 9/00* (2006.01)

(52) U.S. Cl.
CPC ............... *F02C 7/16* (2013.01); *F28F 9/005* (2013.01); *F05D 2260/213* (2013.01)

(58) Field of Classification Search
CPC ...... F02C 7/08; F02C 7/12; F02C 7/14; F02C 7/16; F02C 7/18; F02C 7/185; F05D 2260/213
See application file for complete search history.

(56) References Cited

U.S. PATENT DOCUMENTS

| | | | | |
|---|---|---|---|---|
| 2016/0114898 A1* | 4/2016 | Llamas Castro | ....... | F02C 7/047 415/177 |
| 2016/0131035 A1* | 5/2016 | Diaz | ....................... | F28F 27/02 60/226.1 |
| 2017/0204879 A1* | 7/2017 | Zaccardi | ................. | F01D 9/065 |
| 2017/0284417 A1* | 10/2017 | Zaccardi | ................. | F02C 7/14 |
| 2018/0245853 A1* | 8/2018 | Sennoun | ................ | B33Y 80/00 |
| 2019/0153947 A1* | 5/2019 | Peyron | ................... | B64D 29/06 |

FOREIGN PATENT DOCUMENTS

| | | |
|---|---|---|
| FR | 3065490 | 10/2018 |
| WO | 2018015659 | 1/2018 |

OTHER PUBLICATIONS

Preliminary Search Report for French Application 1903540, dated Nov. 25, 2019.
3M, Thermal Management Fluids, Cool Under Fire product information pages, pp. 1-8.

* cited by examiner

*Primary Examiner* — Craig Kim
(74) *Attorney, Agent, or Firm* — Burris Law, PLLC

(57) ABSTRACT

A surface heat-exchanger for a turbojet engine nacelle between a fluid (C) to be cooled down and air (F) includes a circulation duct of the fluid (C) to be cooled down disposed in contact with air. The circulation duct includes a plurality of channels extending substantially in the same direction with a distance (D) between two adjacent channels between two and five times the width (L) of the channels, each channel having a wall with an area intended to be in contact with air and an area opposite to the area intended to be in contact with air.

13 Claims, 2 Drawing Sheets

SURFACE HEAT-EXCHANGER FOR A COOLING SYSTEM OF AN AIRCRAFT TURBOJET ENGINE

CROSS-REFERENCE TO RELATED APPLICATIONS

This application claims priority to and the benefit of FR 19/03540 filed on Apr. 3, 2019. The disclosure of the above application is incorporated herein by reference.

FIELD

The present disclosure relates to the field of cooling systems of aircraft turbojet engines.

BACKGROUND

The statements in this section merely provide background information related to the present disclosure and may not constitute prior art.

An aircraft is propelled by one or several propulsion unit(s) each comprising a turbojet engine housed within a nacelle. Each propulsion unit is attached to the aircraft by a mast, also called pylon, generally located below or over a wing or at the level of the fuselage of the aircraft.

A turbojet engine may also be called engine. In the following description, the terms engine and turbojet engine will be indifferently used.

A nacelle generally has a tubular structure comprising an upstream section comprising an air inlet upstream of the turbojet engine, a middle section intended to surround a fan of the turbojet engine, a downstream section adapted to accommodate thrust reversal means and intended to surround the combustion chamber of the turbojet engine, and generally terminates in an ejection conduit whose outlet is located downstream of the turbojet engine.

Furthermore, a nacelle usually comprises an outer structure comprising a fixed portion and a movable portion (thrust reversal means), and an inner fixed structure (IFS), concentric with the outer structure. The inner fixed structure surrounds the core of the turbojet engine at the rear of the fan. These outer and inner structures define an annular flow path, also called secondary flow path, intended to channel a so-called secondary cold air flow which circulates outside the turbojet engine.

The outer structure comprises an outer fairing defining an outer aerodynamic surface, intended to be in contact with an outer air flow, and an inner fairing defining an inner aerodynamic surface, intended to be in contact with the secondary air flow. The inner and outer fairings are connected upstream by a leading edge wall forming an air inlet lip.

In general, the turbojet engine comprises a set of blades (compressor and possibly fan or non-ducted propeller) driven in rotation by a gas generator through a set of transmission means.

A lubricant distribution system is provided in the turbojet engine to ensure a proper lubrication of these transmission means and cool them down. The lubricant consists of oil. In the following description, the terms lubricant and oil will be indifferently used.

A cooling system comprising a heat-exchanger allows cooling down the lubricant.

For this purpose, a known method consists in cooling down the lubricant by circulation through an air/oil heat-exchanger using cold air from the secondary flow path of the nacelle or from one of the first stages of the compressor, to cool down the oil of the engine. Such a heat-exchanger is a finned heat-exchanger. It comprises fins in the cold air flow which disturb the flow of the air flow in the secondary flow path or in the compressor, which results in pressure drops (drag), and therefore in losses of performances for the aircraft in terms of fuel consumption (the FB (Fuel Burn) parameter).

Another known method consists in cooling down the lubricant thanks to a cooling system comprising an air/oil heat-exchanger using cold air collected from outside the nacelle or in the secondary flow path, by a scoop disposed respectively on the outer or inner fairing of the nacelle, the cold air being circulated through the heat-exchanger and adapted to serve for deicing of the nacelle, once heated up by the lubricant, by circulation in ducts disposed in contact with the walls of the outer structure of the nacelle, for example at the level of the air inlet lip. Such a system allows for a better control of the exchanged thermal energies, but the presence of scoops within the outer or inner fairing of the nacelle results in a loss of aerodynamic performances, in the same manner as a finned heat-exchanger, and therefore in losses of performances for the aircraft in terms of fuel consumption (the FB (Fuel Burn) parameter).

A known solution for limiting disturbances of the air flow, consists in providing a cooling system comprising a so-called hot source heat-exchanger, between a heat-transfer fluid and the engine oil, and a so-called cold source heat-exchanger, between the heat-transfer fluid and air. Such a cooling system comprises a closed-circuit circulation duct of the heat-transfer fluid. More particularly, the circulation duct of the heat-transfer fluid comprises a portion disposed within the nacelle in contact with the outer and/or inner fairing, said portion forming the cold source heat-exchanger. This is referred to as surface heat-exchanger. Even more particularly, the portion disposed within the nacelle in contact with the inner and/or outer fairing of the nacelle comprises a plurality of channels disposed in parallel, said channels being formed by a double-wall of the inner and/or outer fairing. This is then referred to as structural heat-exchanger.

Thus, the pair constituted by the dissipated thermal power and the aerodynamic performances loss, as well as the added mass, are optimized

SUMMARY

This section provides a general summary of the disclosure and is not a comprehensive disclosure of its full scope or all of its features.

The present disclosure provides a surface heat-exchanger for a nacelle, which allows improving the pair constituted by the dissipated thermal power and the aerodynamic performances loss, and the added mass.

To this end, the present disclosure provides a surface heat-exchanger for a turbojet engine nacelle, between a fluid to be cooled down and air, the heat-exchanger comprising a circulation duct of the fluid to be cooled down disposed in contact with air, and being characterized in that the circulation duct of the fluid to be cooled down comprises a plurality of channels extending in a common direction, and in one form, the channels extend in substantially in the same direction with a distance between two adjacent channels comprised between twice and five times the width of said channels, each channel having a wall comprising an area intended to be in contact with air and an area opposite to the area intended to be in contact with air Thus, the number of channels are determined so that the dissipated thermal power, the aerodynamic performances losses, and the added mass, are reduced.

According to other features of the present disclosure, the heat-exchanger according to the present disclosure comprises one or more of the following optional features considered separately or according to any possible combination.

According to one feature, the area intended to be in contact with air is smooth, in contrast with the opposite area which is corrugated.

Thus, the area intended to be in contact with air is an aerodynamic surface.

According to one feature, the width of the channels is variable from one channel to another.

According to this feature, the distance between two adjacent channels is comprised between twice and five times the maximum width of said channels.

According to one feature, the wall of the channels has a thickness comprised between 0.6 and 4 mm.

According to one feature, the area intended to be in contact with air has a thickness different from the opposite area.

According to one feature, at least the area intended to be in contact with air has a thickness comprised between 1.5 and 4 mm. In this manner, the channels are adapted to withstand lightning.

Thus, the heat-exchanger according to the present disclosure may be disposed in contact with air outside of a nacelle of an aircraft turbojet engine.

More particularly, the heat-exchanger according to the present disclosure may form at least partially the outer fairing of a nacelle of an aircraft turbojet engine.

Furthermore, the heat-exchanger according to the present disclosure may be disposed in contact with air from the secondary flow path of a nacelle of an aircraft turbojet engine downstream of the secondary flow path.

The heat-exchanger may form at least partially the downstream portion of the inner fixed structure of a nacelle of an aircraft turbojet engine.

According to one feature, the wall of the channels has a thickness comprised between 1.5 and 4 mm.

According to one feature, at least two channels have a different thickness.

According to one feature, the channels have a semi-circular shaped section.

This allows balancing the resistance to pressure and the pressure drops.

According to another feature, the channels have a triangular-shaped section. This allows facilitating the forming of the channels, generally carried out by bending and reducing the amount of fluid to be cooled down circulating in the heat-exchanger.

According to one feature, the heat-exchanger comprises a fluid to be cooled down in the circulation duct, the fluid to be cooled down being a heat-transfer fluid less flammable than a lubricant of the turbojet engine, and liquid at temperatures between −70° C. and +175° C. By "less flammable than the lubricant of the turbojet engine," it should be understood that the heat-transfer fluid is flammable at higher temperatures than the lubricant.

The lubricant being generally flammable at 260° C., the heat-transfer fluid is flammable at higher temperatures.

According to one feature, the heat-transfer fluid is non-flammable.

According to one feature, the heat-transfer fluid is liquid at temperatures between −70° C. and +175° C. at a pressure lower than 10 bars.

According to one feature, the heat-transfer fluid has an ignition point higher than 260° C., a combustion point higher than 280° C. and an auto-ignition temperature higher than 400° C. Thus, the heat-exchanger can be disposed in the proximity of electrical equipment.

According to one feature, the heat-transfer fluid has a dielectric constant lower than 6.

According to one feature, the heat-transfer fluid belongs to the hydrofluoroethers (HFE) family. In this manner, the fluid is adapted to remain in the liquid state at temperatures lower than 130° C. at atmospheric pressure, and the heat-exchanger can be disposed throughout the entirety of the nacelle.

According to another feature, the heat-transfer fluid belongs to the silicate esters family.

According to one feature, the heat-transfer fluid is a 3-Ethoxyperfluoro(2-methylhexane), such as the Novec™ 7500 brand, also called Novec™ 7500 Engineered Fluid.

According to one feature, the channels have a width comprised between 5 and 50 mm, and in one form between 6 and 20 mm, and yet in another form between 10 and 15 mm. Thus, the flow rate of the fluid to be cooled down is improved.

As example, the velocity of the fluid to be cooled down in a channel is in the range of 0.5 to 2 m/s.

According to one feature, the heat-exchanger is a so-called cold source surface heat-exchanger, and is intended to cooperate with a so-called hot source heat-exchanger between a lubricant and the fluid to be cooled down.

According to this feature, the circulation duct of the first fluid to be cooled down forms a recirculation loop through the cold source and hot source heat-exchangers.

According to one feature, at least the area opposite to the area intended to be in contact with air is made of aluminum.

The present disclosure also concerns a cooling system, comprising a heat-exchanger as previously described, called cold source heat-exchanger, and a so-called hot source heat-exchanger, between a lubricant to be cooled down and the fluid cooled down in the cold source heat-exchanger.

The present disclosure further concerns a turbojet engine nacelle of the type comprising an outer structure and an inner structure defining an annular flow path for a so-called secondary cold air flow, the outer structure comprising an outer fairing defining an outer aerodynamic surface and an inner fairing defining an inner aerodynamic surface, the outer and inner fairings being connected upstream by a leading edge wall forming an air inlet lip; said nacelle comprising a heat-exchanger as previously described.

According to one feature, the circulation duct of the fluid to be cooled down comprises at least one circulation area of said fluid formed by a double-wall of the outer fairing or of the inner fairing of the nacelle.

By double-wall of the fairing, it should be understood that the area intended to be in contact with air of each channel is formed by the outer or inner fairing of the nacelle.

This is then referred to as structural heat-exchanger.

Thus, the heat exchange is advantageously carried out by convection with outside air or with the secondary cold air flow, and more particularly by forced convection.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
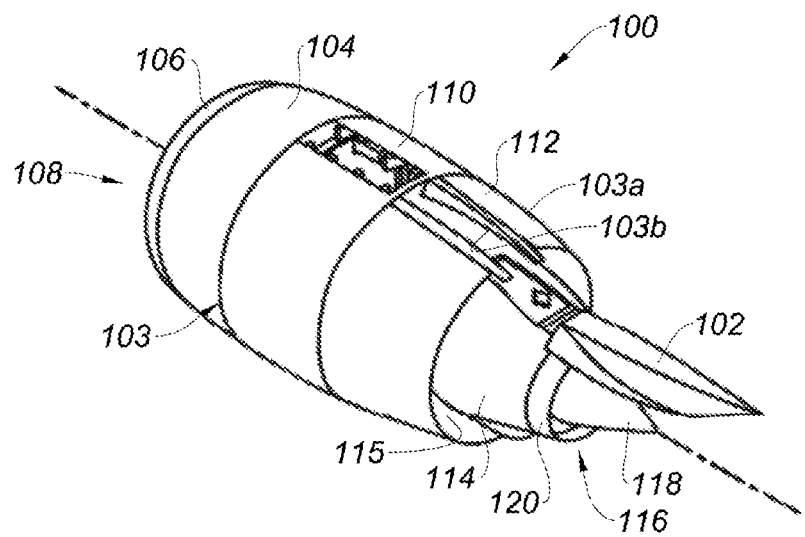
FIG. 1 is a schematic view of a nacelle of an aircraft turbojet engine comprising a surface heat-exchanger according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description and in the claims, identical, similar or analogous components will be referred to by the same reference numerals and the terms "upstream," "downstream," etc. will be used in a non-limiting manner and with reference to the drawings in order to facilitate the description.

FIG. 1 illustrates a nacelle 100 hanging from a pylon 102 intended to be fastened to a wing (not represented) of an aircraft (not represented). The nacelle 100 comprises an outer structure 103 comprising an upstream section 104 provided with a lip 106 forming an air inlet 108, a middle section 110, and a downstream section 112.

The nacelle further comprises an inner fixed structure 114 surrounding a downstream portion of a turbojet engine (not represented) concentrically with respect to the downstream section 112. The inner fixed structure 114 and the outer structure 103 delimit an annular flow path 115 defining a passage for a secondary cold air flow (not represented).

The nacelle 100 also comprises an ejection conduit 116 comprising a gas ejection plug 118 and a gas ejection nozzle 120. The ejection plug 118 and the ejection nozzle 120 define a passage for a hot air flow (not represented) coming out of the turbojet engine (not represented) 200.

The outer structure 103 comprises an outer fairing 103a defining an outer aerodynamic surface, and an inner fairing 103b defining an inner aerodynamic surface, the outer 103a and inner 103b fairings being connected upstream by a leading edge wall (not represented) forming the air inlet 108 lip 106.

Figure 2:
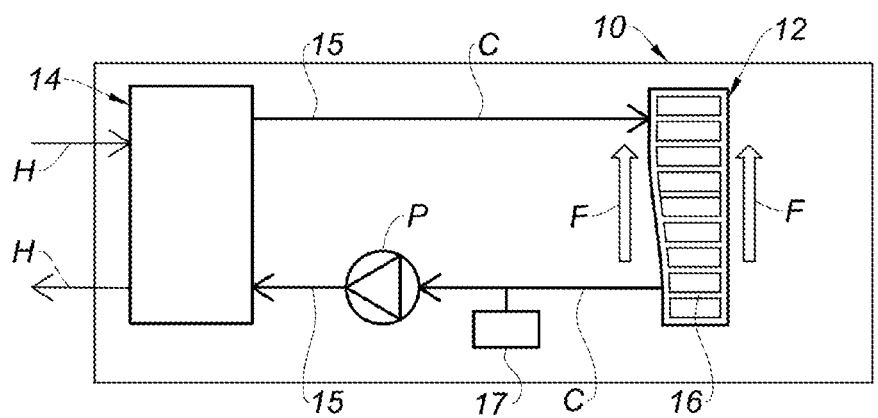
FIG. 2 is a schematic view of a cooling system comprising a surface heat-exchanger according to the present disclosure.

The nacelle comprises a so-called cold source surface heat-exchanger 12 (FIG. 2) between a heat-transfer fluid C (FIG. 2) to be cooled down and a cold air flow F (FIG. 2).

The cold source surface heat-exchanger 12 is disposed within the outer structure 103. It is intended to cooperate with a so-called hot source heat-exchanger 14 (FIG. 2) between an engine lubricant H (FIG. 2) to be cooled down and the heat-transfer fluid C, via a circulation duct 15 (FIG. 2) of the heat-transfer fluid C.

The hot source heat-exchanger 14 is disposed within the turbojet engine (not represented).

The assembly formed by the cold source heat-exchanger 12 and the hot source heat-exchanger 14 forms a cooling system 10 (FIG. 2) of the engine lubricant H.

FIG. 2 illustrates the cooling system 10 of the engine lubricant H.

The cooling system 10 comprises the cold source heat-exchanger 12 and the hot source heat-exchanger 14.

The heat-transfer fluid C circulates in the circulation duct 15 and in the cold source heat-exchanger 12 where it is cooled down by cold air F. The heat-transfer fluid C thus cooled down then circulates in the hot source heat-exchanger 14 where it is heated up by the engine lubricant H.

Thus, the heat-transfer fluid C cooled down by the cold source heat-exchanger allows cooling down the engine lubricant H.

The heat-transfer fluid C is intended to circulate both in the cold source heat-exchanger 12 and in the hot source heat-exchanger 14.

A pump P enables the circulation of the heat-transfer fluid C between the cold source heat-exchanger 12 and the hot source heat-exchanger 14.

An expansion vessel 17 allows accommodating the variation of the volume of the heat-transfer fluid C by the effect of temperature.

The expansion vessel 17 includes a closed tank. Thus, the pressure in the expansion vessel 17 is directly related to the volume occupied by the heat-transfer fluid in the expansion vessel. This feature advantageously allows controlling a maximum and/or minimum pressure in some portions of the circulation duct 15 of the heat-transfer fluid by only tuning the capacity (volume) of the expansion vessel 17.

The expansion vessel 17 is filled with the heat-transfer fluid C and with a volume devoid of heat-transfer fluid, called gaseous sky, which serves as a buffer. It allows limiting the pressure in the circulation duct 15 of the heat-transfer fluid during the expansion of the fluid according to the temperature.

The expansion vessel 17 is a pressurizing means.

Figure 3:
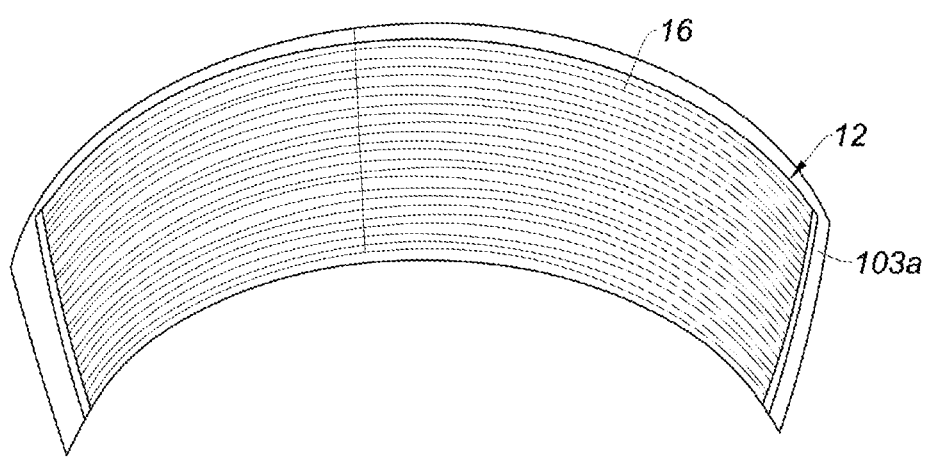
FIG. 3 is a schematic view of a portion of the nacelle of FIG. 1, comprising the surface heat-exchanger according to the present disclosure.

FIG. 3 illustrates the outer fairing 103a at the level of the downstream section 112 of a nacelle 100 (FIG. 1) comprising a cold source heat-exchanger 12.

The cold source heat-exchanger 12 comprises a plurality of channels 16 disposed in parallel, in which the heat-transfer fluid C circulates (FIG. 2). The channels 16 are disposed in contact with the outer fairing 103a.

The outer fairing 103a being in contact with a cold outside air flow, the heat exchange is carried out by convection with the cold outside air flow.

In one variant that is not represented, the cold source heat-exchanger 12 is disposed in contact with the outer fairing 103a at the level of the upstream 104 or middle 110 section of the nacelle 100 (FIG. 1).

Figure 4:
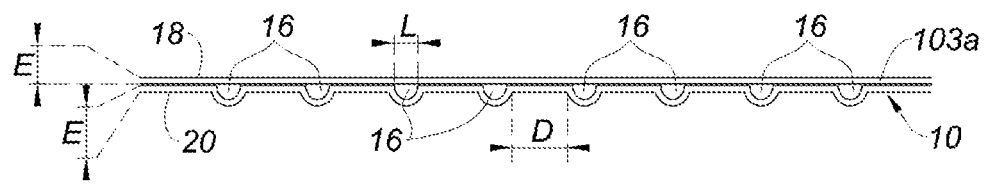
FIG. 4 is a schematic longitudinal sectional view of FIG. 3, the nacelle portion being represented as planar.

FIG. 4 shows that the channels 16 are formed by a double-wall 18, 20 of the outer fairing 103a. Thus, the heat-exchanger 12 forms at least partially the outer fairing 103a. This is referred to as structural heat-exchanger.

The double-wall 18, 20 comprises an area 18 intended to be in contact with outside air and an area 20 opposite to the area 18 intended to be in contact with outside air. The area 18 intended to be contact with outside air is smooth. This is referred to as aerodynamic surface. The opposite area 20 is corrugated.

The channels 16 have a semi-circular shaped section and a width L in the range of 10 mm, and the distance D between the channels 16 is in the range of 30 mm.

Thus, the distance D between the channels 16 is comprised between twice and five times the width L of said channels 16.

Each wall 18, 20 of the channels 16 has a thickness E in the range of 2 mm. In this manner, the area 18 intended to be in contact with outside air is adapted to withstand lightning.

Figure 5:
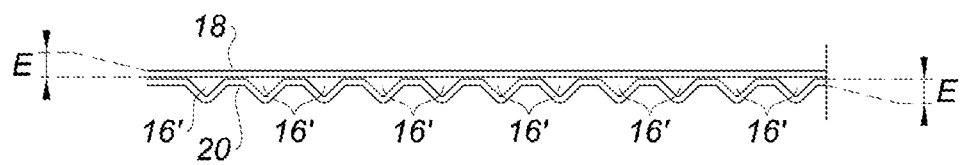
FIG. 5 is a schematic view of a variant of the nacelle portion of FIG. 4.

FIG. 5 illustrates a variant of channels 16' in which the channels 16' have a triangular-shaped section.

The channels 16' according to this variant are formed by a double-wall 18, 20 of the outer fairing 103*a*.

In the same manner as before, the double-wall 18, 20 comprises an area 18 intended to be in contact with outside air and an area 20 opposite to the area 18 intended to be in contact with outside air. The area 18 intended to be in contact with outside air is smooth. This is referred to as aerodynamic surface. The opposite area 20 is corrugated.

The channels 16' further have a width L in the range of 10 mm, and the distance D between the channels 16' is in the range of 30 mm.

Thus, the distance D between the channels 16' is comprised between twice and five times the width L of said channels 16'.

Each wall 18, 20 of the channels 16' has a thickness E in the range of 2 mm. In this manner, the area 18 intended to be in contact with outside air is adapted to withstand lightning.

In one variant that is not represented, the opposite area 20 has a thickness E comprised between 0.6 and 1.5 mm. Indeed, the opposite area 20 is not impacted by lightning.

In one form that is not represented, the cold source heat-exchanger 12 comprises a plurality of channels 16 disposed in parallel, in which the heat-transfer fluid C circulates, the channels 16 being disposed in contact with the inner fairing 103*b* (FIG. 1). In this form, the heat exchange is carried out by convection with the secondary cold air flow. The area 18 intended to be in contact with air is then intended to be in contact with air from the secondary flow path. In the same manner as before, the area 18 intended to be in contact with air from the secondary flow path is smooth. This is referred to as aerodynamic surface.

In this form, the wall 18, 20 has a thickness E comprised between 0.6 and 1.5 mm. Indeed, the wall 18, 20 is not impacted by lightning.

In another form that is not represented, the cold source heat-exchanger 12 is disposed in contact with the outer fairing 103*a* and with the inner fairing 103*b* and the heat exchange is carried out by convection with the cold outside air flow and the secondary cold air flow.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A surface heat-exchanger for a turbojet engine nacelle, between a fluid to be cooled down and air, the surface heat-exchanger comprising a circulation duct of the fluid to be cooled down disposed in contact with the air, the circulation duct comprising a plurality of channels, each channel of the plurality of channels having a width between 5 and 50 mm, the plurality of channels extending in a common direction with a distance between two adjacent channels between two and five times the width of one of the plurality of channels,
    wherein each channel of the plurality of channels has a wall comprising an area in contact with the air and an area opposite to the area that is in contact with the air,
    wherein the width of each channel of the plurality of channels is variable from one channel to another, and
    wherein the distance between two adjacent channels is between two to five times a maximum width of each channel of the plurality of channels.

2. The surface heat-exchanger according to claim 1, wherein the wall of each channel of the plurality of channels has a thickness between 0.6 and 4 mm.

3. The surface heat-exchanger according to claim 1, wherein at least the area in contact with the air has a thickness between 1.5 and 4 mm.

4. The surface heat-exchanger according to claim 1, wherein each channel of the plurality of channels has a semi-circular shaped section or triangular-shaped section.

5. The surface heat-exchanger according to claim 1, wherein the fluid to be cooled down is a heat-transfer fluid that is less flammable than a lubricant of a turbojet engine, the heat-transfer fluid being a liquid at temperatures between −70° C. and +175° C.

6. The surface heat-exchanger according to claim 5, wherein the heat-transfer fluid is nonflammable at temperatures between −70° C. and +175° C. at a pressure of 10 bars.

7. The surface heat-exchanger according to claim 5, wherein the heat-transfer fluid is a 3-Ethoxyperfluoro(2-methylhexane).

8. A cooling system comprising:
    a surface heat-exchanger according to claim 1, wherein the surface heat-exchanger is a cold source heat-exchanger; and
    a hot source heat-exchanger between a lubricant to be cooled down and the fluid being cooled down in the cold source heat-exchanger.

9. A turbojet engine nacelle comprising:
    an outer structure and an inner structure defining an annular flow path for a secondary cold air flow, the outer structure comprising an outer fairing defining an outer aerodynamic surface and an inner fairing defining an inner aerodynamic surface, the outer and inner fairings being connected upstream by a leading edge wall forming an air inlet lip; and
    a surface heat-exchanger according to claim 1.

10. The turbojet engine nacelle according to claim 9, wherein the circulation duct comprises at least one circulation area of the fluid to be cooled down formed by a double-wall of the outer fairing or the inner fairing of the turbojet engine nacelle.

11. The surface heat-exchanger according to claim 1, wherein the width of each channel of the plurality of channels is between 6 and 20 mm.

12. The surface heat-exchanger according to claim 1, wherein the width of each channel of the plurality of channels is between 10 and 15 mm.

13. The surface heat-exchanger according to claim 1, wherein at least the area opposite to the area in contact with the air is made of aluminum.

* * * * *